Figure 1:
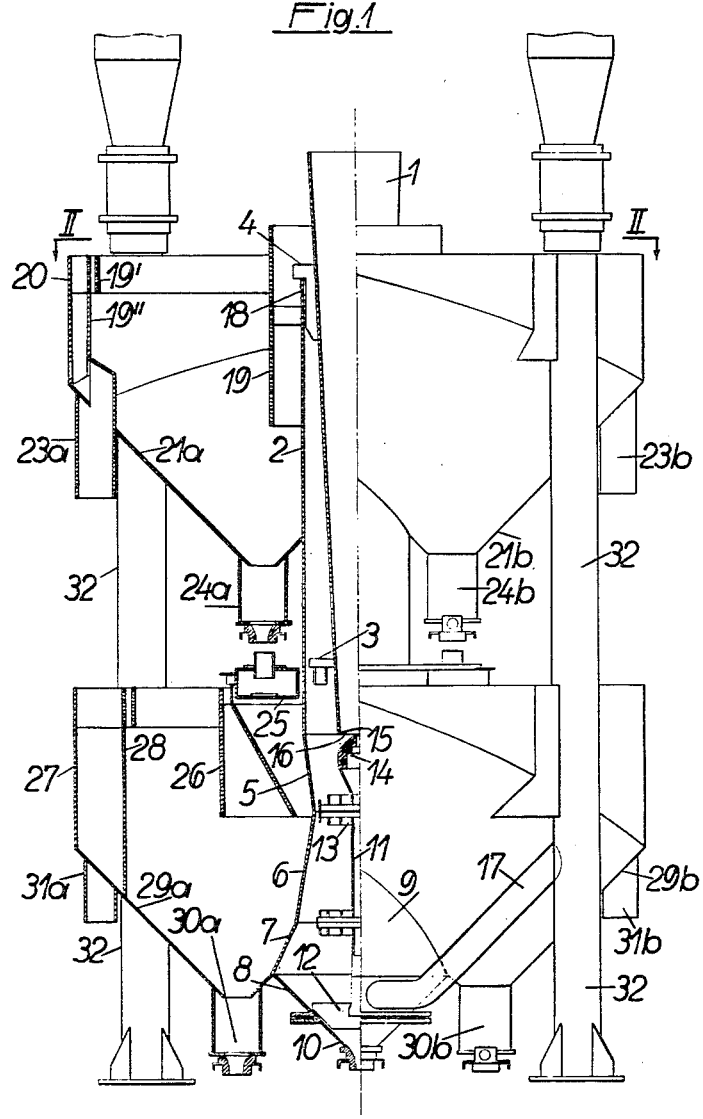

United States Patent Office 2,938,628
Patented May 31, 1960

2,938,628
APPARATUS FOR THE SELECTIVE SEPARATION OF GRANULAR MATERIAL DISTRIBUTED IN LIQUIDS

Alfred Weikert, Vienna, Austria, assignor to Chemie und Metall Handelsgesellschaft mit beschrankter Haftung, Vienna, Austria, a corporation of Austria Filed Mar. 6, 1956, Ser. No. 569,875

Claims priority, application Austria Mar. 7, 1955

1 Claim. (Cl. 209—158)

The present invention relates to a process for the selective separation of granular material distributed in liquids and to apparatus for carrying out this process. In many fields of technology it is necessary to classify granular material having different components and available in a mixture with liquid or mixed with liquid for this purpose, into two or more particle fractions. For instance, it is known to suspend sands having different grain size fractions in water and to subject the suspension thus obtained to vertical hydraulic classification and then to horizontal hydraulic classification.

That process enables a separation of the charged sand mixture into three classes.

It was previously usual to carry out the two successive steps of the separation process in a vertical hydraulic classifier and a horizontal hydraulic classifier arranged side by side, the fines discharged from the vertical hydraulic classifier being fed to the horizontal hydraulic classifier. Such a plant has various disadvantages: It requires a large space and the investment cost for the two separate units are considerable. At least in the first stage of a horizontal hydraulic classifier it is not desirable to charge the feed in a free jet from above because this would cause considerable turbulence, which will disturb the calm and even separating flow since the feed consists of granular material.

If the capacity of a plant is not fully utilized the stream of the inflowing feed material which does not entirely fill the interior of the feed pipe will show a very undesirable tendency to vary its position at the tube wall and to twist. These phenomena are an additional cause for disturbing turbulence. It has been attempted to provide perforated walls, screens plates or the like close to the admission point in order to limit the range of turbulence in the liquid. In this manner it is also possible to obtain suitable flow conditions outside the area enclosed by the stilling means, but the sedimentation area is undesirably reduced.

The disadvantages set forth can be eliminated to a large extent and in a simple manner if in a process for the selective separation of granular material distributed in liquids, comprising a vertical hydraulic classification stage and at least one subsequent horizontal hydraulic classification stage the fines-laden separating upcurrent of the vertical hydraulic classification stage is directly employed for feeding the subsequently arranged horizontal hydraulic classification stage. A plant for carrying out this separating process contains at least one vertical hydraulic classifier and at least one horizontal hydraulic classifier and the vertical hydraulic classifier vessel carrying the separating upcurrent extends through the wall of a subsequently arranged horizontal hydraulic classifier and is constructed to form the feed conduit and inlet thereof.

If the feed conduit and inlet are thus constructed, the cross sections thereof will always be entirely filled with liquid, which is thus fed into the horizontal hydraulic classifier without surges and in a continuous upcurrent. The mouth of the inlet may lie above or below the liquid level in the sedimentation vessel. It is particularly desirable to feed adjacent to the liquid level.

Figure 2:
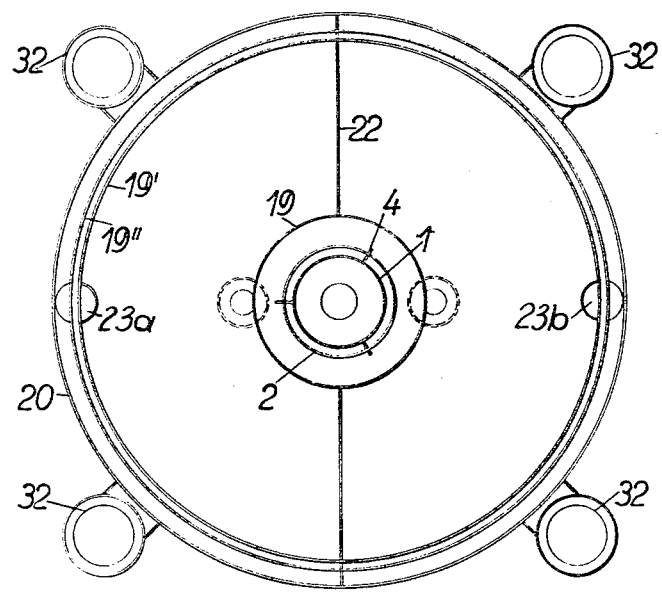

Additional features of the invention will be apparent from the explanation of an illustrative embodiment of the invention with reference to the accompanying drawings, which show a vertical hydraulic classifier connected to a subsequently arranged horizontal hydraulic classifier (behind which another horizontal hydraulic clasification stage is arranged). Fig. 1 is an elevation partly in section and Fig. 2 is a sectional view taken on line II—II of Fig. 1.

A preferably slightly tapering feed pipe 1 is disposed in a coaxial cylinder 2 and supported against the same and centered therein by centering members 3, 4. The cylinder 2 has connected thereto a slender tapering pipe member 5, which is in turn connected to a pear-shaped vessel 9, which is composed of conical pipe sections 6, 7, 8 and has a central outlet 10. An inset 11 having centering attachments 12, 13, whereby it is held in position, has a readily replaceable conical head 14, which 's preferably made of rubber or another corrosion-resistant material and faces the lower opening of the feed pipe 1. The head 14 and the rim 15 of the feed pipe form an adjustable annular gap 16. The adjustment is effected by a longitudinal displacement of the feed pipe 1 relative to the cylinder 2 and the inset 11 fixed therein. Each of the several, e.g. three centring attachments 4 affixed to the feed pipe 1 engages three slots formed in the rim portion of the cylinder wall and spaced, e.g., by 120 deg. The provision of a number of such groups of slots cut to different depths will enable the fixation of the feed pipe 1 at different heights to adjust the gap cross section in adaptation to the rate of feed. A pipe 17—several such pipes may be provided—serves to supply additional liquid, e.g. fresh water. The cylinder 2 forms the outer shell of a vertical hydraulic classifier vessel, which carries the separating upcurrent. According to the invention the cylinder 2 forms also the feed conduit of a horizontal hydraulic classifier arranged around the vertical hydraulic classifier. The upper end of the cylinder 2 is formed as an inlet and provided accordingly with holes 18 and surrounded if desired by a perforated cylindrical shroud 19. The trough of the subsequently arranged horizontal hydraulic classifier is defined laterally by a cylindrical outer wall 20 and at the bottom by two inverted cone members 21a, 21b formed around parallel axes and carrying pipe connections 24a, 24b with outlets at their small ends. Inside the trough space an annular cavity is defined by an inset cylinder 19" disposed close to the outer wall and extending to the bottom of the trough. The upper part of the cylinder 19" is perforated. The bottom of said cavity is provided with outlet pipes 23a, 23b. The interior of the trough is divided into two parts by a partition 22, which extends in the plane of section of the two cone members 21a, 21b and preferably also through said annular cavity. Said two parts may be connected for single or parallel operation, as required. Instead of dividing the horizontal hydraulic classifier vessel into two independently operable halves it may be divided into more parts, e.g. three, or may be of simpler construction. An additional perforated cylindrical inset 19' may be arranged within the inset cylinder 19".

Below said first horizontal hydraulic classifier a second one is disposed, which surrounds also the vessel of the vertical hydraulic classifier and is provided with an inlet having the usual means consisting of perforated plates 25 and perforated cylindrical or conical shells 26 for diverting the liquid current into the horizontal direction and producing an even separating current. The actual sedimentation trough consists of a cylindrical outer shell 27 and a coaxial inner shell, which is perforated close to its upper rim. The outer and inner shells 27 and 28 are closed at the bottom by two cone members 29a, 29b formed on parallel axes. A partition extending in the plane of section of the two cone members 29a, 29b through the annular spaces formed by the two shells 27, 28 of the outer wall 2, 5, 6, 7 of the vertical hydraulic classifier vessel and the two cone members 29a, 29b divides the space available for the classification into two halves or more parts, corresponding to the construction of the foregoing vessel. Said parts may be operated independently or in parallel. Pipes 30a, 30b formed with outlets and disposed at the small ends of cones 29a, 29b serve for the discharge of the separated matter. Outlet pipes 31a, 31b are inserted in the bottom of the (divided) annular space between the shells 27, 28. The superimposed hydraulic classifiers are supported by a structure having tubular columns 32, which serve advantageously also as supply conduits, e.g. for the fresh water required.

The mode of operation of the plant disclosed may be briefly described for simplicity only for a parallel operation of the two halves of each horizontal hydraulic classifier vessel.

The granular feed material to be separated, which is mixed with water, is charged into the feed pipe 1 and passes through the same to the gap 16. Any turbulence caused by rising air bubbles or unevenly distributed solids will be of no consequence because the flow pattern before the gap is of no importance for the separating process. The feed material emerging from the gap is entrained in the uniformized (baffle walls at the centring attachment 13) current of the fresh water fed through pipe 17 and is raised into the annular space defined between the feed pipe 1 and cylinder 2. In this space the rising separating upcurrent of the vertical hydraulic classification process is obtained and is homogenized with the aid of the baffles at the centering member 3. Laden with the entrained fines this current enters through the holes 18 close to the upper rim of the feed pipe and possibly also by flowing over said rim into the horizontal hydraulic classifier vessel close to the liquid level therein. The settling material is discharged through the outlet 10 of the pear-shaped vessel 9. In view of the uniform flow pattern of the liquid supplied and the small velocity of flow and small kinetic energy resulting from the wide cross-sections that inlet will not cause appreciable turbulence. In the case of extremely rigid requirements any small eddies which may form, e.g., at the rims of the holes 18 and are considered a disturbance may be restricted by the perforated wall 19 to the space inside the same. The division of the classifying vessel into two halves (as mentioned hereinbefore it may also be divided into more, e.g. three compartments) enables the capacity of the plant to be adapted to the feed rate in such a manner that the velocities of flow recognized as promoting the separations can be at least approximately adhered to. If only part of the sedimentation area is to be used, care most be taken, of course, that only those of the holes 18 are opened which discharge into the compartment concerned, whereas the other holes 18 must be closed. The coarses separated in that horizontal hydraulic classification step are discharged through the outlets 24a, 24b and enters the inlet of the subsequently arranged second horizontal sedimentation step. The fines enter through the inset 19' and the holes in the upper part of the inset cylinder 19" into the annular space defined by the latter and the outer wall 20 and flows out through the outlet pipes 23a, 23b. Being finer and more uniform and small in quantity the sediment of the first horizontal hydraulic classification stage entering from above into the inlet of the second will cause turbulence only in a restricted degree so that the usual baffling and stilling means will ensure appropriate flow conditions in the sedimentation trough. The separated coarses are withdrawn at the pipes 30a, 30b, the fines through the outlet pipes 31a, 31b. The fines obtained in the two horizontal hydraulic classification processes may be combined in one fraction, if desired.

I claim:

Apparatus for the separation of granular material distributed in a liquid into at least three end fractions by gravity, which comprises a trough-shaped classifier vessel formed with an overflow and a bottom having a bottom outlet, a vertical shell having a pear-shaped lower portion provided at its lower end with an outlet for a subsided fraction and above said outlet with a washing liquid inlet, said shell having an upper portion extending tightly through said bottom, said apparatus comprising further a vertical tube disposed in said shell and defining therewith a flow passage of upwardly decreasing cross-section and arranged to receive said granular material, said tube having an open lower end above said inlet and arranged to feed said granular material into said flow passage, and means for feeding said classifier vessel, said means consisting exclusively of an open top of said upper portion of said shell, which open top is disposed in said classifier vessel substantially on the level of said overflow.

References Cited in the file of this patent
UNITED STATES PATENTS

| 448,319 | Clement-Conti | Mar. 17, 1891 |
| 486,495 | Nibelius | Nov. 22, 1892 |
| 2,172,792 | Hall | Sept. 12, 1939 |
| 2,360,129 | Hebbard | Oct. 10, 1944 |

FOREIGN PATENTS

| 184,237 | Great Britain | July 31, 1922 |
| 243,267 | Switzerland | Jan. 3, 1947 |